(12) United States Patent
Kodaira et al.

(10) Patent No.: US 11,167,653 B2
(45) Date of Patent: Nov. 9, 2021

(54) UNMANNED AERIAL VEHICLE, UNMANNED AERIAL VEHICLE SYSTEM, AND BATTERY SYSTEM

(71) Applicant: Nidec Corporation, Kyoto (JP)

(72) Inventors: Yasumasa Kodaira, Kyoto (JP); Masaki Kato, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 16/610,091

(22) PCT Filed: Jun. 6, 2018

(86) PCT No.: PCT/JP2018/021643
§ 371 (c)(1),
(2) Date: Nov. 1, 2019

(87) PCT Pub. No.: WO2018/225757
PCT Pub. Date: Dec. 13, 2018

(65) Prior Publication Data
US 2020/0079234 A1 Mar. 12, 2020

(30) Foreign Application Priority Data
Jun. 7, 2017 (JP) .............................. JP2017-112645

(51) Int. Cl.
*B60L 1/00* (2006.01)
*B60L 3/00* (2019.01)
(Continued)

(52) U.S. Cl.
CPC ............. *B60L 53/126* (2019.02); *B60L 50/60* (2019.02); *B60L 53/122* (2019.02); *B60L 53/36* (2019.02);
(Continued)

(58) Field of Classification Search
CPC ........ B60L 53/126; B60L 50/60; B60L 58/12; B60L 53/36; B60L 53/37; B60L 53/122;
(Continued)

(56) References Cited

U.S. PATENT DOCUMENTS

2006/0266879 A1 11/2006 Svoboda, Jr.
2012/0091257 A1 4/2012 Wolff et al.
(Continued)

FOREIGN PATENT DOCUMENTS

JP 2016-210229 A 12/2016
JP 2017-026384 A 2/2017
(Continued)

OTHER PUBLICATIONS

Official Communication issued in International Patent Application No. PCT/JP2018/021643, dated Aug. 21, 2018.

*Primary Examiner* — Richard Tan
(74) *Attorney, Agent, or Firm* — Keating & Bennett

(57) ABSTRACT

An unmanned aerial vehicle includes a main body, a propulsion assembly including a rotary blade and a motor to rotate the rotary blade about a rotation axis, the propulsion assembly being attached to the main body, a rechargeable battery to supply electric power to the propulsion assembly, a leg portion connected to the main body on a lower side of the main body in a vertical direction, and a power receiving coil to provide non-contact power feeding, the power receiving coil being electrically connected to the battery and being provided in the leg portion.

9 Claims, 9 Drawing Sheets

(51) Int. Cl.
*H02G 3/00* (2006.01)
*B60L 53/126* (2019.01)
*H02J 50/10* (2016.01)
*B60L 50/60* (2019.01)
*B60L 58/12* (2019.01)
*B60L 53/36* (2019.01)
*B60L 53/37* (2019.01)
*B60L 53/122* (2019.01)
*B64C 25/06* (2006.01)
*B64C 39/02* (2006.01)
*B64F 1/36* (2017.01)
*H02J 7/02* (2016.01)

(52) U.S. Cl.
CPC .............. *B60L 53/37* (2019.02); *B60L 58/12* (2019.02); *B64C 25/06* (2013.01); *B64C 39/024* (2013.01); *B64F 1/362* (2013.01); *H02J 7/025* (2013.01); *H02J 50/10* (2016.02); *B60L 2200/10* (2013.01); *B64C 2201/027* (2013.01); *B64C 2201/042* (2013.01); *B64C 2201/066* (2013.01); *B64C 2201/108* (2013.01)

(58) Field of Classification Search
CPC ....... B60L 2200/10; H02J 50/10; H02J 7/025; H02J 50/12; H02J 7/0042; H02J 2310/44; B64C 25/06; B64C 39/024; B64C 2201/027; B64C 2201/042; B64C 2201/066; B64C 2201/108; B64F 1/362; B64F 1/22; B64D 2221/00; Y02T 90/12; Y02T 90/14; Y02T 10/7072; Y02T 10/70; Y02T 50/60; H04B 5/0075; H04B 5/0037; H01F 1/38
USPC .......................................................... 307/9.1
See application file for complete search history.

(56) References Cited

U.S. PATENT DOCUMENTS

| | | |
|---|---|---|
| 2016/0144734 A1 | 5/2016 | Wang et al. |
| 2016/0311329 A1 | 10/2016 | Rodriguez |
| 2018/0257502 A1* | 9/2018 | Park .................. B64F 1/007 |

FOREIGN PATENT DOCUMENTS

| | | |
|---|---|---|
| JP | 2017-036005 A | 2/2017 |
| JP | 2017-071285 A | 4/2017 |
| JP | 6179689 B1 | 8/2017 |
| JP | 2017-178018 A | 10/2017 |

* cited by examiner

UNMANNED AERIAL VEHICLE, UNMANNED AERIAL VEHICLE SYSTEM, AND BATTERY SYSTEM

CROSS REFERENCE TO RELATED APPLICATIONS

This is a U.S. national stage of PCT Application No. PCT/JP2018/021643, filed on Jun. 6, 2018, and priority under 35 U.S.C. § 119(a) and 35 U.S.C. § 365(b) is claimed from Japanese Application No. 2017-112645, filed Jun. 7, 2017, the entire contents of each application are hereby incorporated herein by reference.

FIELD OF THE INVENTION

The present disclosure relates to an unmanned aerial vehicle, an unmanned aerial vehicle system, and a battery system.

BACKGROUND

A multicopter that flies by electric power supplied from a power feeding wire has been known. For example, a multicopter provided in an illumination system has been known.

With the power supply using a power feeding wire as described above, a multicopter can fly only within the range of the length of the power feeding wire. Therefore, there is a problem that the moving range is limited. On the other hand, by adopting a method of flying with electric power supplied from a battery mounted on the multicopter, it is possible to expand the moving range of the multicopter. In this case, when the remaining amount of the battery decreases or when the battery runs out, it is necessary to charge the battery or replace the battery.

Since charging or replacement of the battery takes a lot of time if it is performed through human hands, it is desired to automate the charging or replacement. However, for example, in the case of charging the battery by connecting an external power supply to the battery, it is necessary to automatically connect the multicopter to the external power supply. Therefore, control of the multicopter tends to be complicated. On the other hand, when the battery is automatically replaced, an apparatus for replacing the battery is likely to be complicated and large. From the above, in the case of automating the charging or replacement of the battery, there is a problem that the manufacturing cost of the multicopter or the charging facility increases.

SUMMARY

One example embodiment of an unmanned aerial vehicle of the present disclosure includes a main body, a propulsion assembly including a rotary blade and a motor to rotate the rotary blade about a rotation axis, the propulsion assembly being attached to the main body, a rechargeable battery to supply electric power to the propulsion assembly, a leg portion to be connected to the main body on a lower side of the main body in a vertical direction, and a power receiving coil to provide non-contact power feeding, the power receiving coil being electrically connected to the battery and being provided in the leg portion.

One example embodiment of a battery system of the present disclosure provides a battery system of an unmanned aerial vehicle, the unmanned aerial vehicle including a main body, and a propulsion assembly including a rotary blade and a motor to rotate the rotary blade about a rotation axis, the propulsion assembly being attached to the main body, the battery system including a rechargeable battery to supply electric power to the propulsion assembly, a leg portion connected to the main body on a lower side of the main body in a vertical direction, and a power receiving coil to provide non-contact power feeding, the power receiving coil being electrically connected to the battery and being provided in the leg portion.

The above and other elements, features, steps, characteristics and advantages of the present disclosure will become more apparent from the following detailed description of the example embodiments with reference to the attached drawings.

DETAILED DESCRIPTION

A Z-axis direction shown as appropriate in each drawing is a direction parallel to a vertical direction. The Z-axis direction is simply referred to as a "vertical direction Z". The positive side in the Z-axis direction, that is, the upper side in the vertical direction is simply referred to as "upper side", and the negative side in the Z-axis direction, that is, the lower side in the vertical direction is simply referred to as "lower side". In addition, an X-axis direction and a Y-axis direction shown as appropriate in each drawing are orthogonal to the Z-axis direction and orthogonal to each other. The X-axis direction is referred to as a "depth direction X", and the Y-axis direction is referred to as a "width direction Y". The depth direction and the width direction are merely names for describing a relative positional relationship of respective parts, and the actual arrangement relationship or the like may be an arrangement relationship or the like other than the arrangement relationship or the like indicated by these names.

Figure 1:
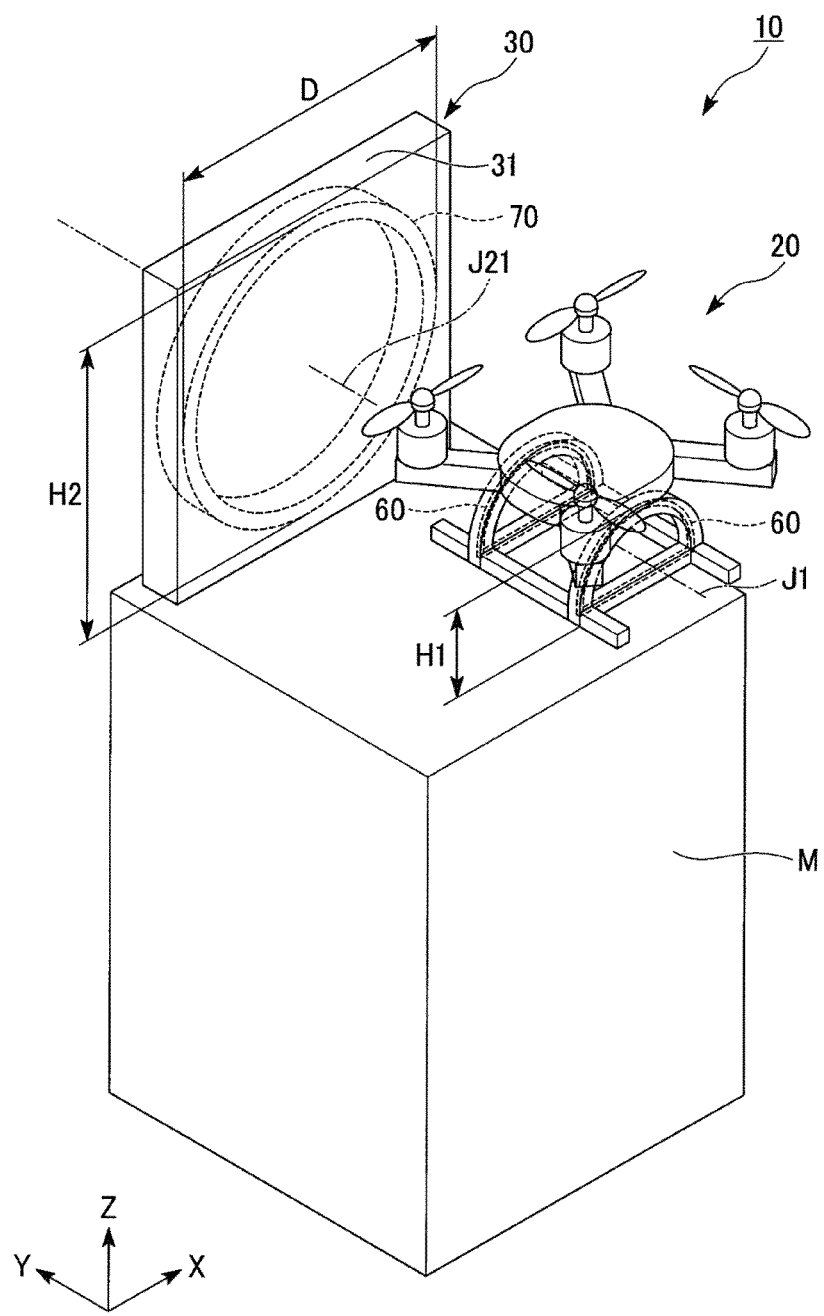
FIG. 1 is a perspective view showing an unmanned aerial vehicle system of an example embodiment of the present disclosure.
Figure 2:
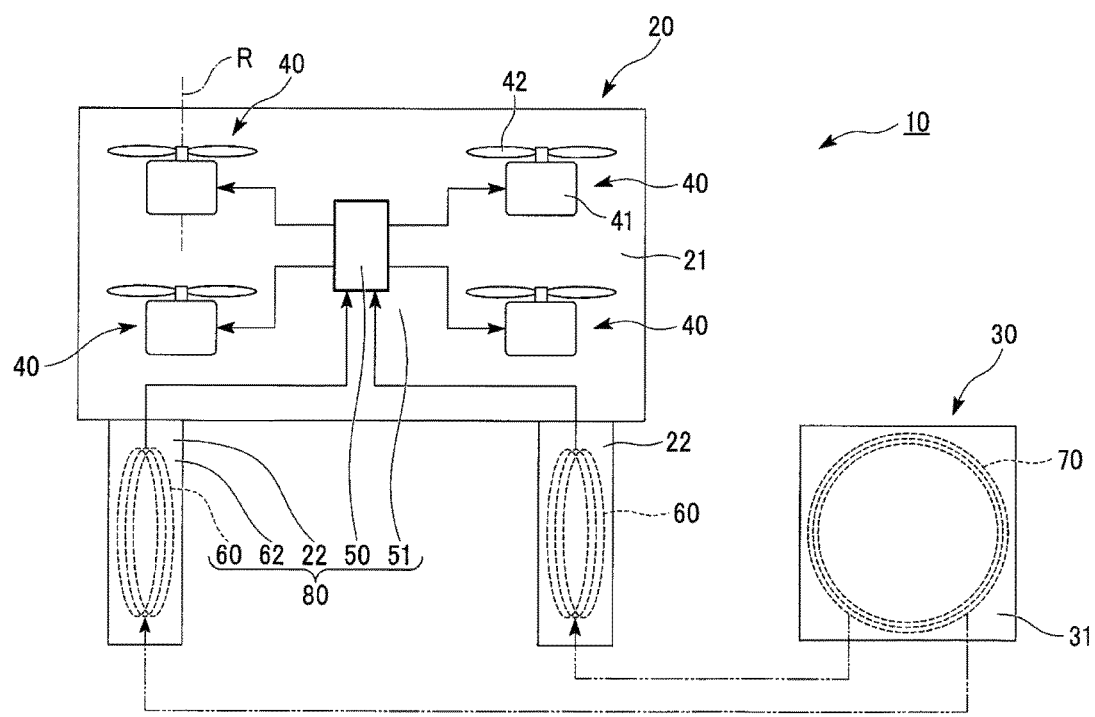
FIG. 2 is a schematic diagram schematically showing the unmanned aerial vehicle system of the present example embodiment.
Figure 3:
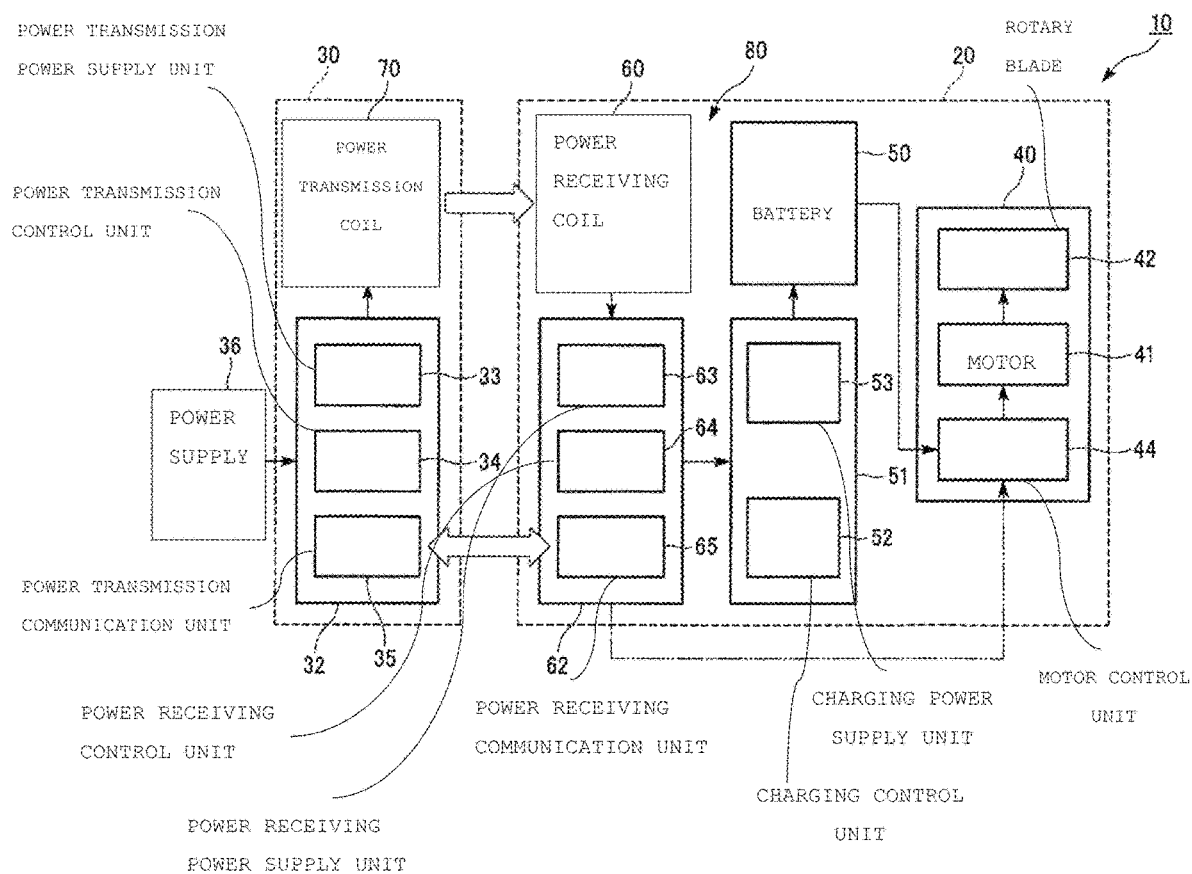
FIG. 3 is a diagram illustrating an example of a functional configuration of the unmanned aerial vehicle system of the present example embodiment.

As shown in FIGS. 1 to 3, an unmanned aerial vehicle system 10 of the present example embodiment includes a power transmission device 30 and an unmanned aerial vehicle 20. In the present example embodiment, the power transmission device 30 is installed on an upper surface of a vending machine M, for example. The power transmission device 30 includes a power transmission device main body 31 and a power transmission coil 70. The power transmission device main body 31 has, for example, a rectangular parallelepiped shape that is flat in the width direction Y. The power transmission device main body 31 is disposed at the end on one side in the width direction on an upper surface of a vending machine M.

As shown in FIG. 1, the power transmission coil 70 has an annular shape centering on a second central axis J21 parallel to the width direction Y. That is, the second central axis J21 of the power transmission coil 70 extends in a direction orthogonal to the vertical direction Z. The power transmission coil 70 is embedded in the power transmission device main body 31. The power transmission coil 70 is a non-contact power feeding coil capable of transmitting power to a power receiving coil 60 described later. In the depth direction X orthogonal to both the second central axis J21 and the vertical direction Z, a dimension D of the power transmission coil 70 is, for example, 648 mm or smaller.

Here, in a typical standard of the vending machine M, for example, the dimension in the depth direction X of the vending machine M is 648 mm or larger and 819 mm or smaller, and the dimension in the width direction Y of the vending machine M is 870 mm or larger and 1378 mm or smaller. Therefore, by setting the dimension D of the power transmission coil 70 within the above numerical range, the power transmission coil 70 is installable on the upper surface of the vending machine M in any vending machine M as long as it conforms to the typical standard. Note that the dimension D of the power transmission coil 70 may be larger than 648 mm as long as it is within the dimension range of the typical standard of the vending machine M described above.

Figure 4:
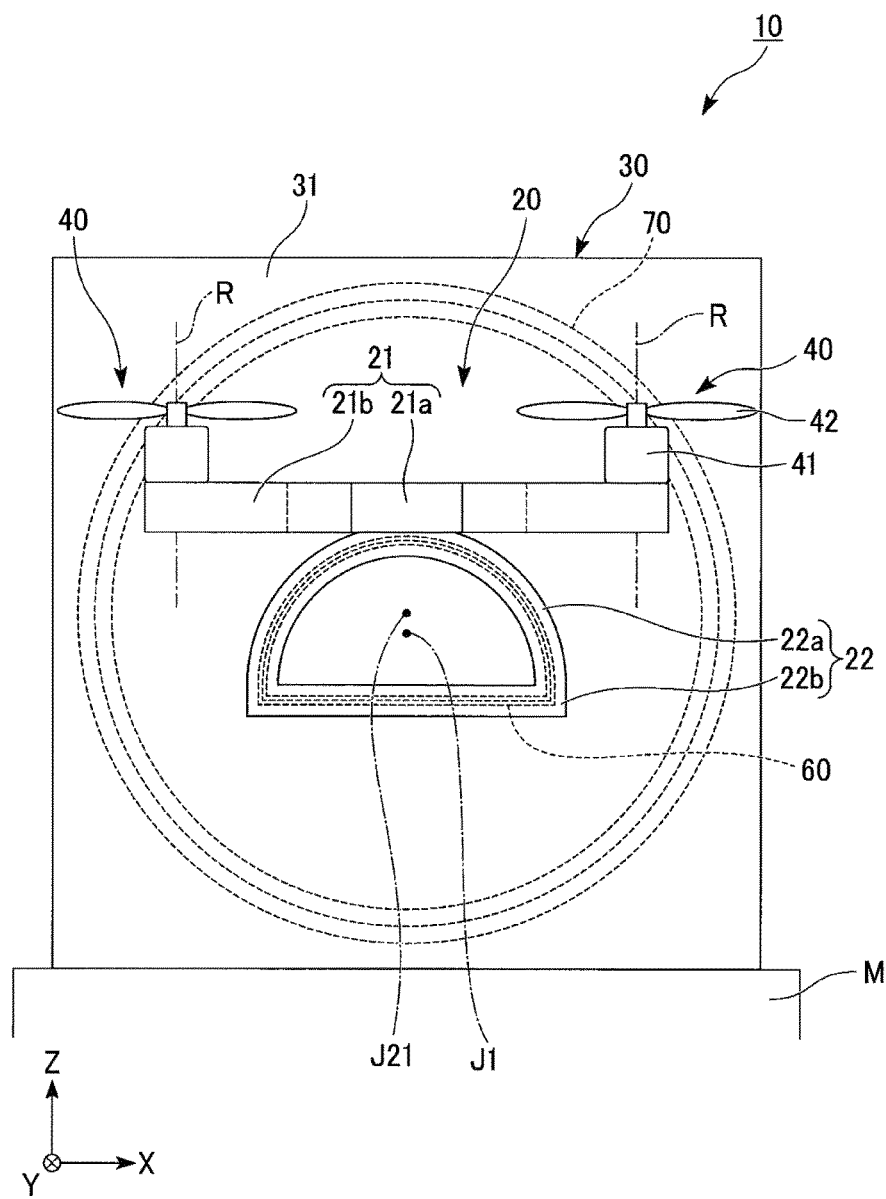
FIG. 4 is a diagram of the unmanned aerial vehicle system of the present example embodiment as viewed along a width direction.

A dimension H2 in the vertical direction Z of the power transmission coil 70 is larger than a dimension H1 in the vertical direction Z of a leg portion 22 described later. Therefore, as shown in FIG. 4, it is possible to dispose the entire leg portion inside the outer edge of the power transmission coil 70 as viewed along the width direction Y.

As illustrated in FIG. 3, the power transmission device 30 further includes a power transmission unit 32. Electric power is supplied 32 from an external power supply 36 to the power transmission unit. The power supply 36 may be a DC power supply or an AC power supply such as a commercial power supply. The power transmission unit 32 includes a power transmission power supply unit 33, a power transmission communication unit 35, and a power transmission control unit 34.

The power transmission power supply unit 33 outputs electric power supplied from the power supply 36 to the power transmission coil 70 based on the control by the power transmission control unit 34. The power transmission communication unit 35 includes, for example, an infrared sensor or the like, and receives infrared light for communication emitted from a power receiving communication unit 65, described later, provided to the unmanned aerial vehicle 20. The power transmission communication unit 35 may emit infrared light for communication to the power receiving communication unit 65 of the unmanned aerial vehicle 20. The power transmission control unit 34 controls power supply by the power transmission coil 70 based on the infrared light received by the power transmission communication unit 35.

As shown in FIGS. 2 to 5, the unmanned aerial vehicle 20 includes a main body 21, a propulsion assembly 40, a battery 50, the leg portion 22, a connecting beam part 23, and the power receiving coil 60. In the following description, the relative positional relationship between the respective parts of the unmanned aerial vehicle 20 will be described in the case where the orientation of the unmanned aerial vehicle 20 is the orientation shown in FIGS. 4 and 5 unless otherwise specified.

Figure 5:
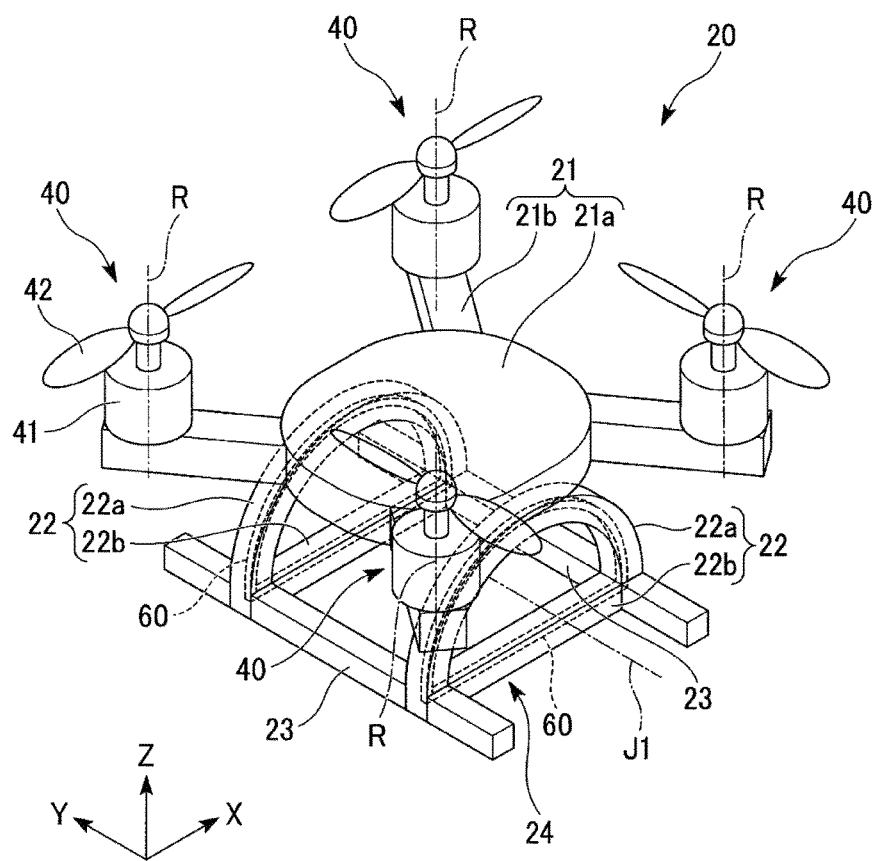
FIG. 5 is a perspective view showing an unmanned aerial vehicle of the present example embodiment.

As shown in FIG. 5, the main body 21 includes a base 21*a* and an arm 21*b*. The base 21*a* extends along a plane orthogonal to the vertical direction Z. The shape as viewed from the upper side of the base 21*a* is substantially circular. The arm 21*b* has a quadrangular prism shape extending substantially radially from the base 21*a* in a direction orthogonal to the vertical direction Z. For example, four arms 21*b* in total are provided side by side in the depth direction X, two on each side of the base 21*a* in the width direction Y.

The propulsion assembly 40 is attached to the main body 21. In the present example embodiment, a plurality of the propulsion assemblies 40 are provided. The plurality of propulsion assemblies 40 are respectively provided at the tips of the arms 21*b*. That is, for example, four propulsion assemblies 40 in total are provided side by side in the depth direction X, two on each side of the main body 21 in the width direction Y. The propulsion assembly 40 includes a motor 41 and rotary blades 42. The motor 41 is disposed on the upper surface of the tip of the arm 21*b*. The rotary blade 42 is fixed to the shaft of the motor 41. The motor 41 rotates the shaft to thereby rotate the rotary blades 42 about a rotation axis R. In the present example embodiment, the rotation axis R extends in the vertical direction Z. As the rotary blades 42 rotate, the unmanned aerial vehicle 20 obtains buoyancy from the propulsion assembly 40 and also obtains propulsion in a direction orthogonal to the vertical direction Z. As shown in FIG. 3, the propulsion assembly 40 further includes a motor control unit 44. The motor control unit 44 outputs the electric power, supplied from the battery 50, to the motor 41 based on information from a flight control unit not shown.

As shown in FIG. 2, the battery 50 is a rechargeable battery disposed in the main body 21. The battery 50 is electrically connected to the propulsion assembly 40 and supplies electric power to the propulsion assembly 40. In the present example embodiment, for example, one battery 50 is provided. The one battery 50 is electrically connected to the plurality of propulsion assemblies 40 and supplies electric power to the plurality of propulsion assemblies 40. The type of the battery 50 is not particularly limited as long as it is a rechargeable battery.

As shown in FIG. 5, the leg portion 22 is connected to the main body 21 on the lower side of the main body 21. In the present example embodiment, a plurality of the leg portions 22 are provided. More specifically, a pair of the leg portions 22 is provided via a gap in one direction orthogonal to the vertical direction Z. In the present example embodiment, one direction is the width direction Y. The pair of leg portions 22 has a frame shape that protrudes downward from the main body 21 and surrounds a first central axis J1 parallel to the width direction Y. For example, the first central axis J1 passes through the center in the depth direction X at the center in the vertical direction Z of the leg portion 22. In the present example embodiment, the distance in the width direction Y between the pair of leg portions 22 is uniform over the entire vertical direction Z.

As shown in FIG. 4, the leg portion 22 includes a semicircular arc portion 22*a* that protrudes upward, and a linear portion 22*b* that extends linearly in the depth direction X. The top of the arc portion 22*a* is connected to the lower surface of the base 21a. The linear portion 22b connects the lower ends of the arc portion 22a. In the present example embodiment, the leg portion 22 is a single member with the main body 21, for example. The main body 21 and the leg portion 22 are made of resin, for example.

As shown in FIG. 5, the connecting beam part 23 has a quadrangular prism shape extending in the width direction Y. A pair of the connecting beam parts 23 is provided in the depth direction X via a gap. The pair of connecting beam parts 23 connects the pair of leg portions 22 to each other. More specifically, one connecting beam part 23 connects the ends on one side in the depth direction of the linear portions 22b of the pair of leg portions 22. The other connecting beam part 23 connects the ends on the other side in the depth direction of the linear portions 22b of the pair of leg portions 22. By connecting the linear portions 22b of the pair of leg portions 22 and the pair of connecting beam parts 23, a rectangular frame-shaped frame part 24 surrounding an axis parallel to the vertical direction Z is configured.

The leg portion 22 and the connecting beam part 23 are used for, for example, an application in which a transported object or the like carried by the unmanned aerial vehicle 20 is mounted on the unmanned aerial vehicle 20. A transported object is mounted on the unmanned aerial vehicle 20 by being hooked on, for example, the linear portion 22b and the connecting beam part 23. In the present example embodiment, since the leg portion 22 has a frame shape, it is easy to hook a transported object with respect to the leg portion 22. Further, when the unmanned aerial vehicle 20 flies, the air resistance applied to the unmanned aerial vehicle 20 can be reduced.

The power receiving coil 60 is a coil for non-contact power feeding. As shown in FIG. 2, the power receiving coil 60 is electrically connected to the battery 50. When a magnetic field generated by the electric current flowing through the power transmission coil 70 acts on the power receiving coil 60, the electric current flows through the power receiving coil 60. Thus, power can be supplied from the power receiving coil 60 to the battery 50, and the battery 50 can be charged. Therefore, by bringing the unmanned aerial vehicle 20 closer to the power transmission device 30, non-contact power feeding can be performed by the power receiving coil 60 and the power transmission coil 70 without connecting the battery 50 to an external power supply. Further, since non-contact power feeding can be performed by the power receiving coil 60 and the power transmission coil 70, the structure of the unmanned aerial vehicle 20 and the structure of the power transmission device 30 can be simplified. As described above, charging of the battery 50 can be automated with a simple structure and control.

Further, for example, when the unmanned aerial vehicle is automatically moved to connect the battery and an external power supply, a terminal for connecting the battery and the external power supply may be exposed to the outside. For this reason, when the power transmission device is installed outdoors, the terminal may get wet with rain, which may cause a problem in charging the battery. On the other hand, according to the present example embodiment, since it is not necessary to connect the battery 50 to an external power supply, it is not necessary to expose the terminal to the outside. Therefore, even if the power transmission device 30 is installed outdoors, the battery 50 can be suitably charged. Further, since the charging of the battery 50 can be automated, the battery 50 can be charged if the unmanned aerial vehicle 20 is movable even in a place where it is difficult for a person to enter.

The power receiving coil 60 is provided on the leg portion 22. Therefore, it is not necessary to separately provide a part where the power receiving coil 60 is provided, and the unmanned aerial vehicle 20 can be reduced in size and weight. Further, it is not necessary to change the shape of the unmanned aerial vehicle 20. The power receiving coil 60 is provided in a frame shape along the leg portion 22. Therefore, it is easy to provide the power receiving coil 60 on the leg portion 22 while obtaining the above-described effects with the leg portion 22 in a frame shape. In the present example embodiment, since the leg portion 22 has a frame shape surrounding the first central axis J1 extending in the width direction Y, the power receiving coil 60 also has a frame shape surrounding the first central axis J1, as shown in FIG. 4. The power receiving coil 60 extends in a semicircular shape that protrudes upward.

In the present example embodiment, the unmanned aerial vehicle 20 charges the battery 50 with the power receiving coil 60 overlapping the power transmission coil 70 in the width direction Y, for example, in a state where the unmanned aerial vehicle 20 flies to a position above the upper surface of the vending machine M. Thereby, even if a transported object is mounted on the leg portion 22 and the transported object is disposed below the leg portion 22, the battery 50 can be easily charged. The unmanned aerial vehicle 20 may charge the battery 50 in a state where it has landed on the upper surface of the vending machine M.

In the present example embodiment, the power receiving coil 60 and the power transmission coil 70 are coils for non-contact power feeding by a magnetic field resonance system. In the case of using non-contact power feeding by the magnetic field resonance system, when the power receiving coil 60 is brought close to the power transmission coil 70, electric current can be generated in the power receiving coil 60 regardless of the relative orientation between the power receiving coil 60 and the power transmission coil 70. Therefore, it is easy to charge the battery 50 regardless of the orientation of the unmanned aerial vehicle 20 with respect to the power transmission device 30 and the orientation of the power receiving coil 60 with respect to the unmanned aerial vehicle 20. Thus, even when the position control accuracy of the unmanned aerial vehicle 20 is relatively low, it is possible to easily charge the battery 50 by simply bringing the unmanned aerial vehicle 20 closer to the power transmission device 30. Therefore, the battery 50 can be automatically charged by simpler control of the unmanned aerial vehicle 20.

In the present example embodiment, the power receiving coil 60 is embedded in the leg portion 22. Therefore, the leg portion 22 can be made by insert molding in which resin is poured in a state where the power receiving coil 60 is inserted in the mold. Accordingly, the unmanned aerial vehicle 20 can be easily manufactured.

The power receiving coil 60 is provided to each of the plurality of leg portions 22. Therefore, the battery 50 can be charged by the electric current generated in the plurality of power receiving coils 60. In the present example embodiment, as shown in FIG. 2, the plurality of power receiving coils 60 are electrically connected to one battery 50, so that one battery 50 can be charged by the electric current generated in the plurality of power receiving coils 60. Therefore, the battery 50 can be charged more quickly.

As shown in FIG. 4, the dimension in the depth direction X and the dimension in the vertical direction Z of the power receiving coil 60 are smaller than the outer diameter of the power transmission coil 70. Therefore, when the unmanned aerial vehicle 20 is brought close to the power transmission device 30, the power receiving coil 60 is easily placed in the magnetic field generated by the power transmission coil 70, and electric current is easily generated in the power receiving coil 60. Further, as described above, since the dimension H2 of the power transmission coil 70 is larger than the dimension H1 of the leg portion 22, the entire leg portion 22 is easily disposed inside the outer edge of the power transmission coil 70 as viewed along the width direction Y. Therefore, it is easy to dispose the entire power receiving coil 60 provided on the leg portion 22 inside the outer edge of the power transmission coil 70.

In the present example embodiment, since the pair of leg portions 22 is disposed with a gap in the width direction Y, by moving the unmanned aerial vehicle 20 to one side in the width direction Y of the power transmission device 30, it is possible to overlap the entire two power receiving coils 60 in the width direction Y as shown in FIG. 4 so as to dispose them inside the outer edge of the power transmission coil 70. As a result, a single power transmission coil 70 can generate electric current in all of the plurality of power receiving coils 60. Therefore, it is not necessary to provide a plurality of power transmission coils 70, and the structure of the power transmission device 30 can be simplified. In addition, since electric current can be generated in all of the power receiving coils 60 simultaneously, the battery 50 can be charged more quickly.

Figure 6:
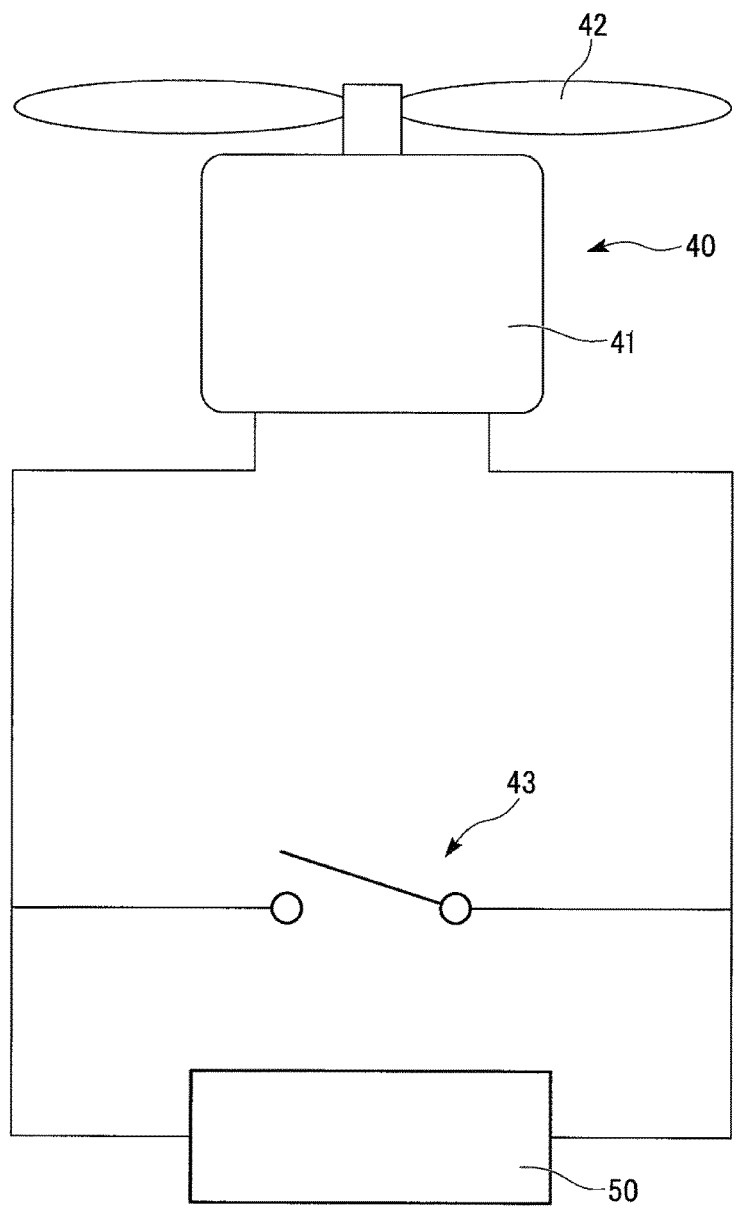
FIG. 6 is a diagram showing the connection between a motor and a battery of the present example embodiment.

As shown in FIG. 6, the unmanned aerial vehicle 20 further includes a switching circuit 43. The switching circuit 43 is provided between two wires that connect the two terminals of the battery 50 and the two terminals of the motor 41, respectively. The switching circuit 43 connects the two wires in the ON state. As a result, the switching circuit 43 connects the terminals of the motor 41 and short-circuits them in the ON state. Therefore, turning the switching circuit 43 on can prevent the motor 41 from rotating. Thereby, when the motor 41 is stopped and the battery is charged, it is possible to suppress the motor 41 from malfunctioning due to the magnetic field generated by the power transmission coil 70.

As shown in FIG. 3, the unmanned aerial vehicle 20 further includes a power receiving unit 62 and a battery control unit 51. The power receiving unit 62 includes a power receiving power supply unit 63, a power receiving communication unit 65, and a power receiving control unit 64. The power receiving power supply unit 63 outputs electric power supplied from the power receiving coil 60 to the battery control unit 51 based on the control by the power receiving control unit 64. The power receiving communication unit 65 includes, for example, a light source that emits infrared light or the like for communication, and emits infrared light based on the control by the power receiving control unit 64. The power receiving communication unit 65 receives infrared light emitted from the power transmission communication unit 35.

The power receiving control unit 64 controls the power receiving communication unit 65. Specifically, the power receiving control unit 64 outputs a power supply start request signal and a power supply stop request signal to the power receiving communication unit 65. The power receiving communication unit 65 transmits the power supply start request signal and the power supply stop request signal, output from the power receiving control unit 64, to the power transmission device 30.

The battery control unit 51 includes a charging power supply unit 53 and a charging control unit 52. The charging power supply unit 53 outputs the electric power supplied from the power receiving unit 62 to the battery 50 based on the control by the charging control unit 52. The charging control unit 52 controls the start and stop of charging of the battery 50.

In the present example embodiment, a battery system 80 is configured of the battery 50, the leg portions 22, the connecting beam parts 23, the power receiving coils 60, the power receiving unit 62, and the battery control unit 51. That is, the battery system 80 includes the battery 50, the leg portions 22, the connecting beam parts 23, the power receiving coils 60, the power receiving unit 62, and the battery control unit 51.

The present disclosure is not limited to the above-described example embodiment, and other configurations described below can also be adopted. The rotation axis R on which the rotary blade 42 rotates may extend in a direction other than the vertical direction Z. For example, the rotation axis R may extend in a direction orthogonal to the vertical direction Z. Further, the extending directions of the rotation axes R in the plurality of rotary blades 42 may be different from each other. Further, the number of propulsion assemblies 40 is not particularly limited.

Further, a plurality of batteries 50 may be provided. In this case, the power receiving coil 60 may be connected to each of the plurality of batteries 50 one by one, or a plurality of power receiving coils 60 may be connected to each other. The battery 50 may be provided for each propulsion assembly 40. Further, the switching circuit 43 may not be provided.

Further, the power receiving coil 60 and the power transmission coil 70 may be non-contact power feeding coils of a system other than the magnetic field resonance system. The power receiving coil 60 and the power transmission coil 70 may be, for example, electromagnetic induction type non-contact power feeding coils or radio wave reception type non-contact power feeding coils. In the magnetic field resonance system, power can be supplied even if the power receiving coil 60 and the power transmission coil 70 are misaligned. Therefore, even when the power receiving coil 60 is positioned outside the outer edge of the power transmission coil 70, power can be supplied. The unmanned aerial vehicle does not necessarily have to land within the outer edge of the power transmission coil 70.

Figure 7:
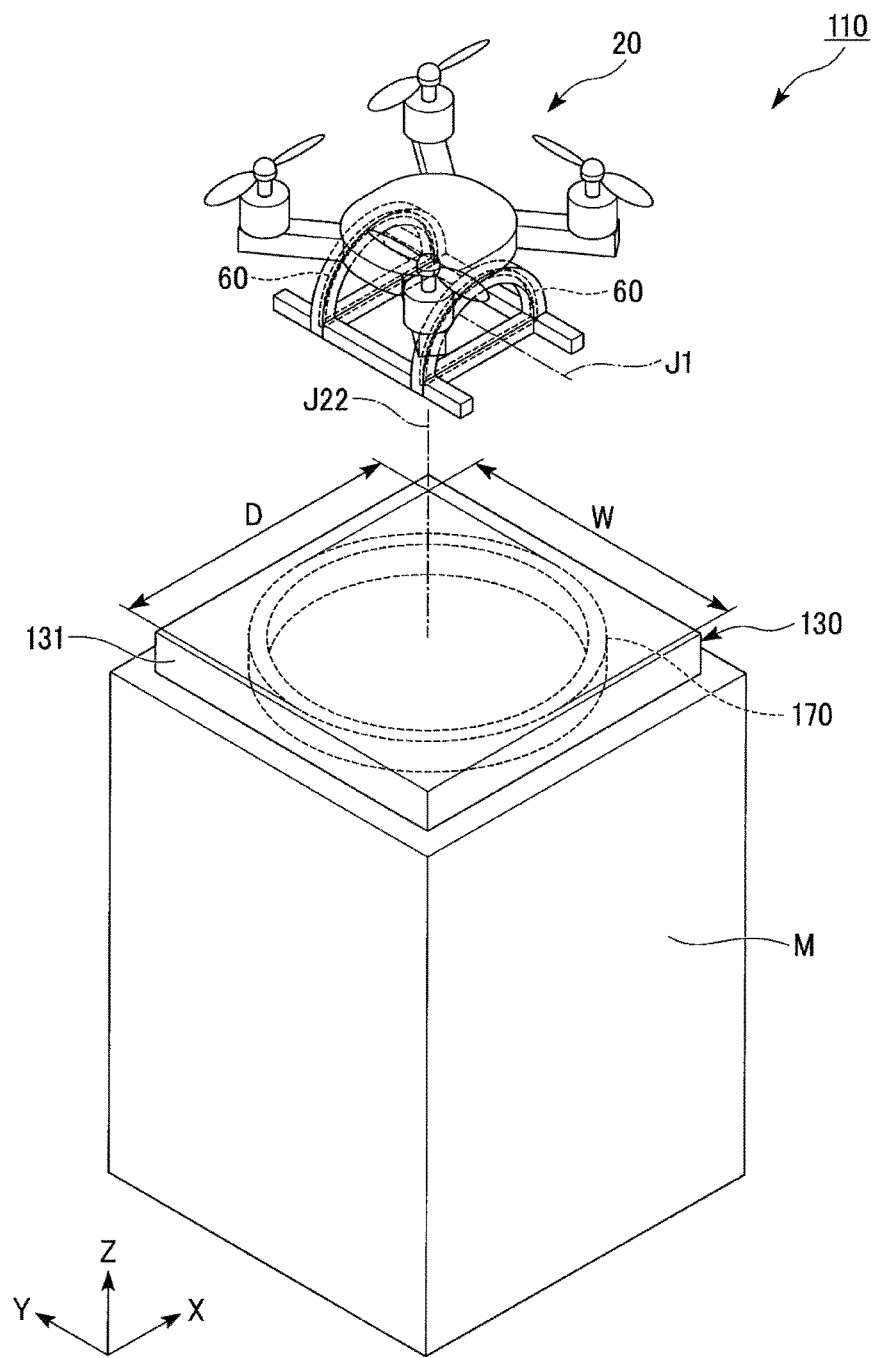
FIG. 7 is a perspective view showing an unmanned aerial vehicle system as another example of the present example embodiment.

Further, the power transmission device 30 may have a configuration similar to that of the power transmission device 130 shown in FIG. 7. As shown in FIG. 7, in the unmanned aerial vehicle system 110, the power transmission device main body 131 of the power transmission device 130 has a rectangular parallelepiped shape that is flat in the vertical direction Z, for example. The power transmission device main body 131 is disposed on the upper surface of the vending machine M. The power transmission coil 170 has an annular shape centering on a second central axis J22 parallel to the vertical direction Z. In this configuration, the first central axis J1 surrounded by the power receiving coil 60 of the unmanned aerial vehicle 20 and the second central axis J22 of the power transmission coil 170 are substantially orthogonal. Even in this case, by using non-contact power feeding of the magnetic field resonance system, it is possible to charge the battery 50 by generating electric current in the power receiving coil 60. In the power transmission device 130, for example, the power transmission device 30 shown in FIG. 1 is rotated by 90° about an axis parallel to the depth direction X.

The dimension in the depth direction X of the power transmission coil 170 is 648 mm or smaller, and the dimension W in the width direction Y of the power transmission coil 170 is 870 mm or smaller. Thus, the power transmission coil 170 is installable on the upper surface of the vending machine M in any vending machine M as long as it conforms to the typical standard.

In this configuration, in the unmanned aerial vehicle 20, the battery 50 is charged in a state where the unmanned aerial vehicle 20 has landed on the upper surface of the power transmission device main body 131, for example. When the unmanned aerial vehicle 20 lands without carrying a transported object, the lower surface of the frame part 24 configured of the leg portions 22 and the connecting beam parts 23 comes into contact with the landing surface. Therefore, by allowing the unmanned aerial vehicle 20 to land on the upper surface of the power transmission device main body 131, the leg portion 22 can be brought closer to the upper surface of the power transmission device main body 131. Thereby, the power receiving coil 60 can be brought close to the power transmission coil 170 embedded in the power transmission device main body 131. Therefore, it is easier to charge the battery 50.

Further, the outer diameter of the power transmission coil 70 of the power transmission device 30 may be larger than the maximum dimension of the unmanned aerial vehicle 20. In this case, since the entire unmanned aerial vehicle 20 is easily disposed inside the outer edge of the power transmission coil 70, the battery 50 can be charged by simultaneously generating electric current for the plurality of power receiving coils 60. Note that in the present specification, the "maximum dimension of the unmanned aerial vehicle" includes the length of a longest virtual line segment among the virtual line segments connecting two arbitrary points in the unmanned aerial vehicle. Further, the installation location of the power transmission device 30 is not particularly limited. The dimensions of the power transmission coil 70 can be appropriately determined according to the installation location of the power transmission device 30. Part or whole of the power transmission coil 70 may be exposed from the power transmission device main body 31.

Further, the power receiving coil 60 may be provided only to a part of the leg portions 22. That is, in the above-described example embodiment, the power receiving coil 60 may be provided only to one leg portion 22 of the pair of leg portions 22. The shape of the leg portion 22, the shape of the power receiving coil 60, and the shape of the power transmission coil 70 are not particularly limited, and may be rectangular, polygonal, or elliptical. The shape of the leg portion 22 may not be a frame shape but may be a plate shape, for example. The shape of the power receiving coil 60 and the shape of the power transmission coil 70 may be different from each other. The first central axis J1 surrounded by the leg portion 22 and the power receiving coil 60 may be parallel to the vertical direction Z. Further, the number of power receiving coils 60 mounted on the unmanned aerial vehicle 20 is not particularly limited. Further, the number of leg portions 22 is not particularly limited.

Further, in this specification, "the power receiving coil is provided to the leg portion" means that at least a part of the power receiving coil may be provided to the leg portion. That is, in the above-described example embodiment, a configuration in which the entire power receiving coil 60 is provided to the leg portion 22 is described. However, the present disclosure is not limited thereto. For example, the power receiving coil 60 may be provided to the frame part 24. In this case, the power receiving coil 60 has a rectangular frame shape along the frame part 24, and a part of the power receiving coil 60 is provided to the linear portion 22b of the leg portion 22.

Figure 8:
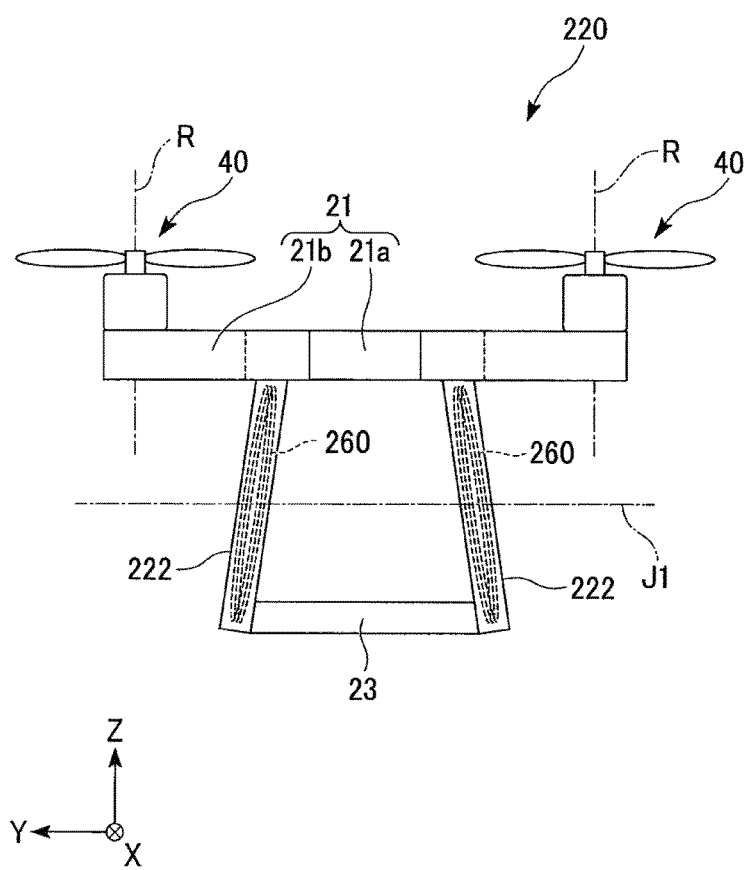
FIG. 8 is a view of an unmanned aerial vehicle as another example of the present example embodiment, as viewed along a depth direction.

Further, the leg portion 22 may have a configuration similar to that of a leg portion 222 shown in FIG. 8. As shown in FIG. 8, in the unmanned aerial vehicle 220, the distance in the width direction Y between a pair of the leg portions 222 increases toward the lower side. That is, the pair of leg portions 222 protrudes downward from the main body 21 in a direction inclined with respect to the vertical direction Z. Therefore, a power receiving coil 260 provided to the leg portion 222 is also inclined with respect to the vertical direction Z. In this case, the power receiving coil 260 and the power transmission coil 70 tend to be inclined with respect to each other, but the battery 50 can be suitably charged by adopting non-contact power feeding by the magnetic field resonance system.

Further, even when the leg portion 222 is provided to be inclined as in this configuration, the battery 50 can be easily charged as described above by simply providing the power receiving coil 260 along the leg portion 222. That is, the battery 50 can be easily charged while the power receiving coil 60 is provided to the leg portion 222 without changing the inclination of the leg portion 222 with respect to the main body 21.

Further, the leg portion 22 may be detachable from the main body 21. In this case, it is easy to replace the battery system 80 configured of the battery 50, the leg portion 22, the connecting beam part 23, and the power receiving coil 60. Further, the connecting beam part 23 may not be provided.

Figure 9:
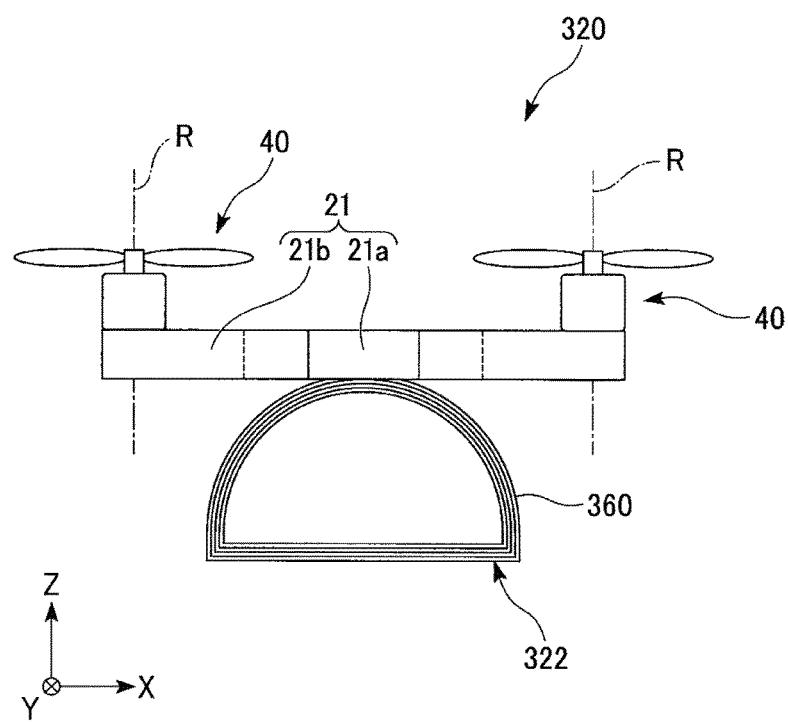
FIG. 9 is a diagram of an unmanned aerial vehicle as another example of the present example embodiment, as viewed along a width direction.

Further, in this specification, "the power receiving coil is provided on the leg portion" includes a case where the leg portion itself is the power receiving coil as a leg portion 322 shown in FIG. 9. As shown in FIG. 9, the leg portion 322 of an unmanned aerial vehicle 320 is configured of a power receiving coil 360. The power receiving coil 360 is fixed to the main body 21. According to this configuration, since the power receiving coil 360 can be used as the leg portion 322, the leg portion 322 can be made by forming the power receiving coil 360. Therefore, it is easy to form the leg portion 322 provided with the power receiving coil 360, and the unmanned aerial vehicle 320 can be easily manufactured.

Further, the power transmission communication unit 35 and the power receiving communication unit 65 may perform communication at all times or at predetermined intervals. The power receiving unit 62 may receive power receiving state information indicating a state of power receiving by the power receiving coil 60 from the power transmission communication unit 35. Note that the power transmission communication unit 35 and the power receiving communication unit 65 are not limited to adopt the system using infrared light, and other systems such as wireless communication may be adopted. The unmanned aerial vehicle 20 performs horizontal movement or rotational movement based on the power receiving state information received by the power receiving communication unit 65. That is, the motor control unit 44 controls the motor 41 based on the power receiving state information indicating the state of power receiving by the power receiving coil 60, whereby the unmanned aerial vehicle 20 moves.

Further, as indicated by a two-dot chain line in FIG. 3, the power receiving unit 62 may be directly connected to the motor control unit 44. In this configuration, electric power is directly supplied from the power receiving unit 62 to the motor control unit 44. In this configuration, the power receiving control unit 64 may determine whether to supply electric power from the battery 50 to the motor control unit 44 or to supply electric power from the power receiving unit 62 to the motor control unit 44, for example.

Moreover, the use of the unmanned aerial vehicle and the unmanned aerial vehicle system of the above-described example embodiment is not particularly limited. Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. An unmanned aerial vehicle comprising:
   a main body;
   a propulsion assembly including a rotary blade and a motor to rotate the rotary blade about a rotation axis, the propulsion assembly being attached to the main body;
   a rechargeable battery to supply electric power to the propulsion assembly;
   a leg portion connected to the main body on a lower side of the main body in a vertical direction; and
   a power receiving coil to provide non-contact power feeding, the power receiving coil being electrically connected to the battery and being provided in the leg portion; wherein the leg portion has a closed frame shape which includes a central hole;
   the power receiving coil is provided along the closed frame shape of the leg portion and surrounds the central hole;
   the leg portion protrudes downward from the main body in the vertical direction;
   a plurality of the leg portions are provided; and
   the power receiving coil is provided to each of the plurality of leg portions.

2. The unmanned aerial vehicle according to claim 1, wherein the power receiving coil provides non-contact power feeding through a magnetic field resonance system.

3. The unmanned aerial vehicle according to claim 2, wherein
   a pair of the leg portions is provided via a gap in one direction orthogonal or substantially orthogonal to the vertical direction; and
   a distance between the pair of leg portions in the one direction increases as the pair of leg portions extends toward a lower side in the vertical direction.

4. The unmanned aerial vehicle according to claim 1, wherein the leg portion is defined by the power receiving coil.

5. The unmanned aerial vehicle according to claim 1, further comprising a switching circuit that connects and short-circuits terminals of the motor in an ON state.

6. An unmanned aerial vehicle system comprising:
   the unmanned aerial vehicle according to claim 1; and
   a power transmission device including a power transmission coil to provide non-contact power feeding capable of transmitting electric power to the power receiving coil.

7. The unmanned aerial vehicle system according to claim 6, wherein
   a second central axis of the power transmission coil extends in a direction orthogonal or substantially orthogonal to the vertical direction; and
   a total dimension of the power transmission coil in the vertical direction is larger than a total dimension of the leg portion in the vertical direction.

8. The unmanned aerial vehicle system according to claim 6, wherein
   a second central axis of the power transmission coil extends in a direction orthogonal or substantially orthogonal to the vertical direction; and
   a total dimension of the power transmission coil in a direction orthogonal or substantially orthogonal to both the second central axis of the power transmission coil and the vertical direction is about 648 mm or smaller.

9. A battery system of an unmanned aerial vehicle, the unmanned aerial vehicle including:
   a main body; and
   a propulsion assembly including a rotary blade and a motor to rotate the rotary blade about a rotation axis, the propulsion assembly being attached to the main body;
   the battery system comprising:
   a rechargeable battery to supply electric power to the propulsion assembly;
   a leg portion connected to the main body on a lower side of the main body in a vertical direction; and
   a power receiving coil to provide non-contact power feeding, the power receiving coil being electrically connected to the battery and being provided in the leg portion; wherein
   the leg portion protrudes downward from the main body in the vertical direction;
   a portion of the power receiving coil which is provided in the leg portion extends downward from the main body in the vertical direction;
   a plurality of the leg portions are provided; and
   the power receiving coil is provided to each of the plurality leg portions.

* * * * *